Nov. 7, 1961

G. F. STEARN 3,008,107

INDUCTIVE WINDINGS

Filed Sept. 4, 1958

7 Sheets-Sheet 1

Inventor:
George Fletcher Stearn
By:
Stevens, Davis, Miller and Mosher
Attorneys Nov. 7, 1961

G. F. STEARN 3,008,107

INDUCTIVE WINDINGS

Filed Sept. 4, 1958

7 Sheets-Sheet 2

Inventor:
George Fletcher Stearn
By:
Stevens, Davis, Miller & Mosher
Attorneys

Nov. 7, 1961 G. F. STEARN 3,008,107
INDUCTIVE WINDINGS
Filed Sept. 4, 1958 7 Sheets-Sheet 3

Nov. 7, 1961 G. F. STEARN 3,008,107
INDUCTIVE WINDINGS
Filed Sept. 4, 1958 7 Sheets-Sheet 6

Inventor:
George Fletcher Stearn
By: Stevens, Davis, Miller & Mosher
Attorneys

United States Patent Office 3,008,107
Patented Nov. 7, 1961

3,008,107
INDUCTIVE WINDINGS
George Fletcher Stearn, Stafford, England, assignor to The English Electric Company Limited, London, England, a British company
Filed Sept. 4, 1958, Ser. No. 759,047
Claims priority, application Great Britain Apr. 29, 1953
9 Claims. (Cl. 336—130)

This application is a continuation-in-part of my application Ser. No. 424,444, now abandoned, lodged April 20, 1954.

The invention relates to inductive windings such as are employed in electric transformers.

When a voltage surge is applied to an inductive winding, the initial surge voltage distribution through the winding is largely determined by the values and distribution of series capacitance relative to ground capacitance in the various parts of the winding. With simple types of winding, by far the greater part of the surge voltage is imposed across that part of the winding adjacent the input or line terminal; whereas in steady conditions at working frequency the voltage distribution is more nearly uniform throughout the winding. The insulation between turns, and also that between parts of the winding, may be endangered either by the initial surge voltage distribution or by the voltage oscillations, possibly of very large amplitude, which may accompany the subsequent transition to steady conditions.

Figure 2:
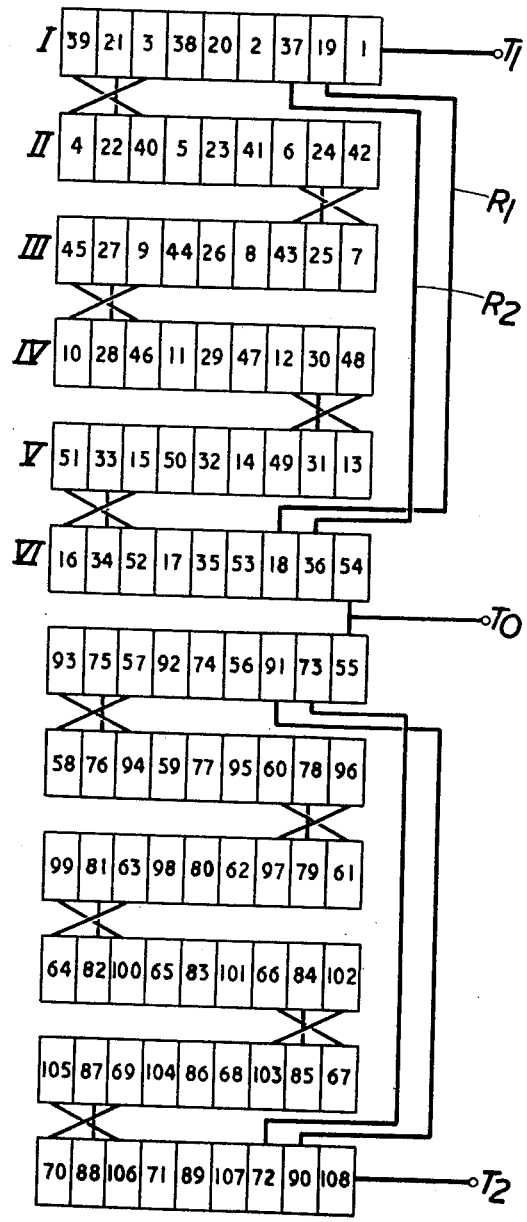
Figure 3:
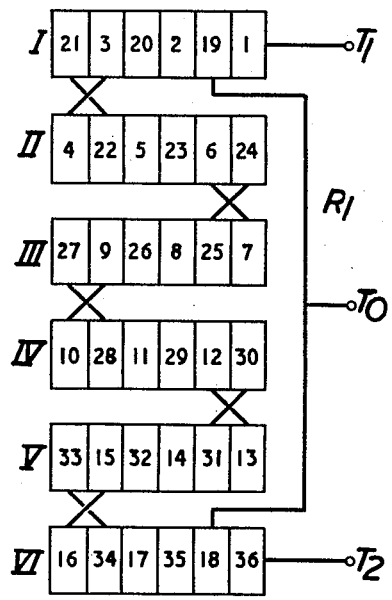

In the specification of United States Patent 2,453,552 I described arrangements of disc coil windings which provide high values of series capacitance. In one of those arrangements, as shown in FIG. 3 of that specification, the outside turns of the two sections of a coil are interchanged. In another of those arrangements, as shown in FIG. 2 of that specification, two conductors are wound superposed and interleaved in the two sections of a coil, and the finishing turn of one conductor is directly connected to the starting turn of the other conductor so that the two conductors are connected in series to complete the coil.

When any of the arrangements according to Patent 8,453,552 is applied throughout a transformer winding, a good approach to the ideal surge characteristic is achieved, in that the initial surge voltage distribution is not far removed from the ultimate voltage distribution in steady conditions at working frequency. This improvement can be attributed to the increase in series capacitance relative to ground capacitance, as compared with a winding of simple type, afforded by winding arrangements according to my previous invention.

It is frequently necessary to use, in conjunction with a main power transformer, an auxiliary transformer having a winding or part of a winding connected in series with a winding of the main transformer; this auxiliary transformer acting for example as a booster or as an auto-transformer for tap-changing. In testing such systems in which the main transformer winding embodied the invention of my Patent 2,453,552, and in consequence had a relatively high series capacitance, I found that the associated winding of the auxiliary transformer was subjected to very high voltage stresses under surge voltage conditions and was liable to break down. This was the case both for auxiliary transformers having windings of conventional formation and for auxiliary transformers whose windings embodied the invention of my prior patent.

An auxiliary transformer will usually have a core with a smaller cross-sectional area than that of the associated inductive winding of the main transformer, and it will therefore have a smaller value of voltage per turn. For mechanical reasons, the auxiliary transformer winding, if of the disc coil type of construction, will have a large number of coils although the total number of turns will be much smaller than in the winding of the main transformer. The ultimate voltage distribution at working frequency will therefore give a considerably lower voltage per coil than that in the main transformer winding.

It became apparent that the breakdowns experienced in these systems under applied voltage surges were due to an excessive proportion of the surge voltage appearing across the auxiliary winding and subjecting it to a much higher voltage per coil than was the case in steady conditions. The winding insulation was imperilled both by the initial surge voltage and by the amplitude of the voltage oscillations which accompanied subsequent transition to steady conditions.

To achieve an initial surge voltage distribution which had a lower voltage per coil than that arising in the main transformer, and which would therefore correspond with the voltage distribution in steady conditions, it appeared necessary to provide a considerably higher value of series capacitance in the auxiliary transformer winding than that in the main transformer winding.

The aforesaid breakdowns that occurred on surge voltage test in the windings of auxiliary transformers connected in series with main transformers led me to analyze the problem, with the result that I was faced with the desirability of devising a winding which would give even higher values of series capacitance than those which could be obtained by the arrangements according to my earlier patent. Experiments had shown that the highest values of series capacitance which could be achieved with the arrangements according to my earlier patent were those obtained when two conductors were wound interleaved in the two sections (one inwardly-spiralling and the other outwardly-spiralling) of a single coil, the finishing turn of one conductor being directly connected to the starting turn of the other conductor.

In principle, my present invention consists in carrying interleaved conductors together, not only through the pair of sections (one inwardly-spiralling and the other outwardly-spiralling) which together form a single coil, but onward through a plurality of such pairs of sections, before connecting back the finishing turn of one of the conductors to the starting turn of the other so that they are connected in series. By these means I find that I can achieve greater values of series capacitance than are obtainable by any of the arrangements described in the specification of my earlier patent, and the arrangements employed can be wound without undue difficulty.

Figure 7:
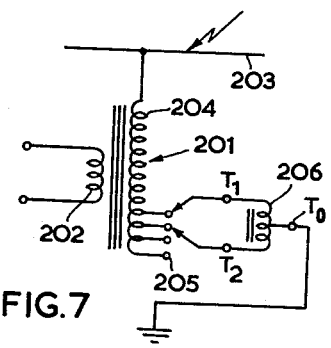
Figure 8:
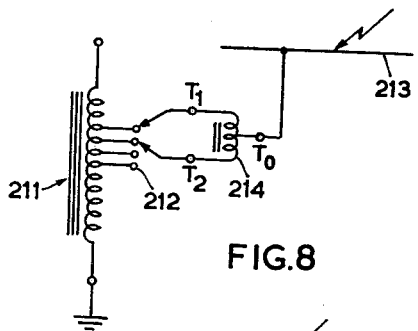
Figure 9:
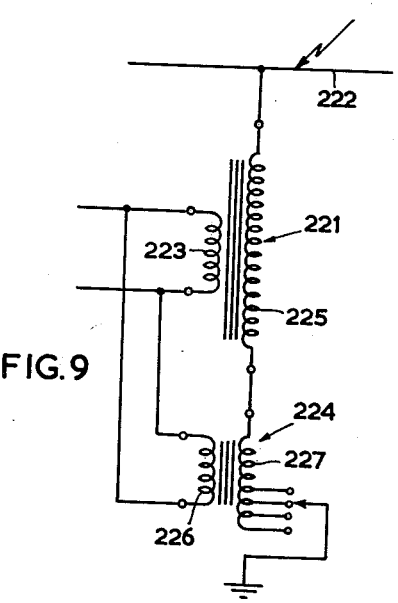
Figure 10:
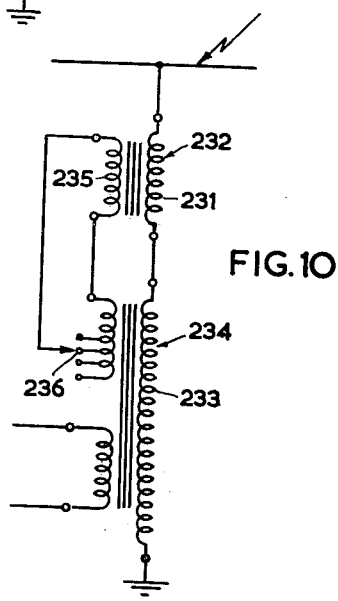
Figure 11:
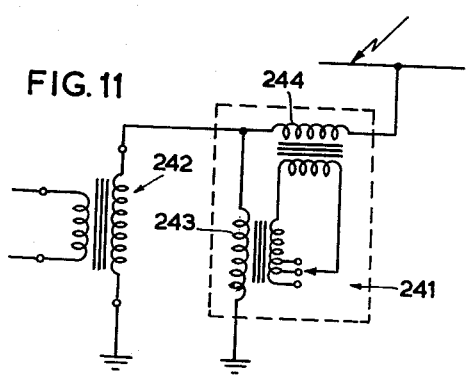
Figure 12:
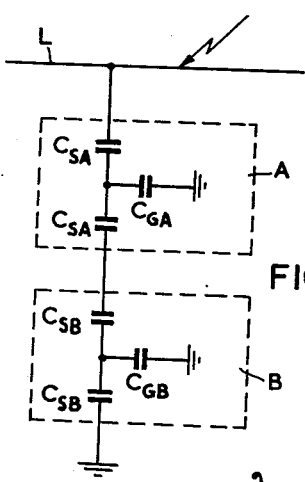

In the accompanying drawings, FIGS. 1 to 6 show diagrammatically alternative arrangements for the windings of a mid-tapped auto-transformer, each arrangement embodying the invention in a preferred form; FIGS. 7 and 8 are circuit diagrams showing the application of an auto-transformer wound in accordance with any of FIGS. 1 to 6 to tap-change switching on a winding of a main power transformer; FIG. 7(a) is a diagram showing in greater detail the arrangement represented by FIG. 7; FIGS. 9 and 10 are circuit diagrams showing arrangements in which a transformer having a winding wound (with minor modifications) in accordance with any of FIGS. 1 to 6 is employed as a booster transformer in conjunction with a main power transformer; FIG. 11 is a circuit diagram showing a modified arrangement generally similar to FIG. 10; and FIG. 12 is a simplified equivalent circuit diagram applicable to any of the arrangements shown in FIGS. 7 to 11.

Each of FIGS. 1 to 6 represent diagrammatically a radial section through a stack of annular sections which constitute a winding. In each of these figures it is assumed that the longitudinal axis (not shown) of the stack is on the left of the figure.

Figure 1:
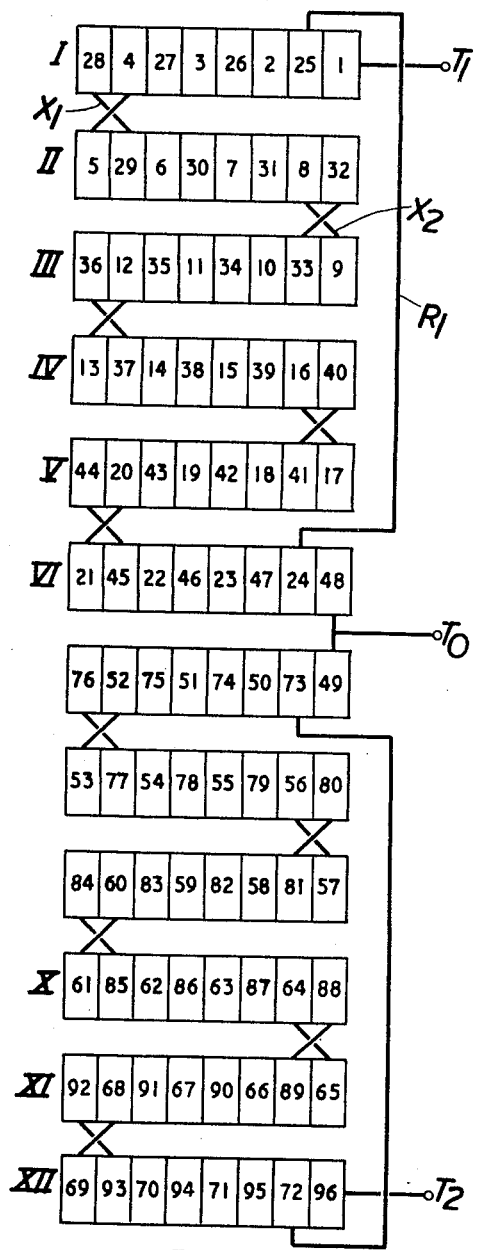

In the winding illustrated by FIGURE 1, the mid-tap terminal $T_0$ is joined to the connector between turns 48 and 49, and the end terminals $T_1$ and $T_2$ are joined respectively to the first and last turns 1 and 96.

The winding is divided into six pairs of annular sections; that is, three pairs for each half winding. In the first section of each pair, i.e. in the odd-numbered sections I, III, V, etc. the conductors spiral inwardly; in the second section of each pair, i.e. in the even-numbered sections II, IV, and VI, etc. the conductors spiral outwardly. In each section there are four turns of each of two conductors, and the turns of these two conductors are superposed and interleaved in a single radial layer so that every turn 1, 2, 3, 4 of one conductor lies juxtaposed to, but insulated from, at least one of the turns 25, 26, 27, 28 of the other conductor. Likewise, every turn 25, 26, 27, 28 of the second conductor lies juxtaposed to, but insulated from, at least one of the turns 1, 2, 3, 4 of the first conductor.

Inner cross-connectors at $X_1$ join the last turns 4 and 28 of the two conductors at the inside of the first section I respectively to the first turns 5 and 29 of the two conductors at the inside of the second section II. Outer cross-connectors at $X_2$ join the last turns 8 and 32 of the two conductors at the outside of the second section II respectively to the first turns 9 and 33 of the two conductors at the outside of the first section III of the second pair of sections. The two conductors are thus wound side by side throughout all the sections I–VI in the half winding.

The last turn 24 of one of the conductors in the second section VI of the last pair of sections in the first half winding is directly connected by return connector $R_1$ to the first turn 25 of the other of the conductors in the first section I of the first pair of sections in this half-winding.

The winding exhibits a high degree of series capacitance owing to the capacitive by-path which exists from terminal $T_1$ to terminal $T_0$ through the capacitive couplings between the first few turns 1, 2, 3 of one conductor in section I and the first few turns 25, 26 of the other conductor in section I, then through the return connector $R_1$ to turn 24 in section VI and through the capacitive couplings between the last few turns 23, 24 of the first conductor in section VI and the last few turns 46, 47, 48 of the second conductor in section VI.

The arrangement of the second half winding made up of turns 49 to 96, between terminal $T_2$ and mid-tap terminal $T_0$, is symmetrical with the arrangement between terminals $T_1$ and $T_0$.

In the winding illustrated by FIGURE 2 the mid-tap terminal $T_0$ is joined to the connector between turns 54 and 55, and the end terminals $T_1$ and $T_2$ are joined respectively to the first and last turns 1 and 108.

The winding is again divided into six pairs of annular sections; that is, three pairs for each half winding, and again the conductors spiral inwardly in the odd-numbered sections and outwardly in the even-numbered sections; but in each section there are three turns of each of three conductors which are superposed and interleaved in a single radial layer. Every turn 1, 2, 3 of one conductor lies juxtaposed to, but insulated from, one of the turns 19, 20, 21 of a second conductor; and each of these turns 19, 20, 21 lies juxtaposed to, but insulated from, one of the turns 37, 38 or 39 of a third conductor.

Inner cross-connectors joint the last turns 3, 21, 39 of the three conductors at the inside of the first section I respectively to the first turns 4, 22, 40 of the three conductors at the inside of the second section II. Outer cross-connectors join the last turns 6, 24, 42 of the three conductors at the outside of the second section II respectively to the first turns 7, 25, 43 of the three conductors at the outside of the first section III of the second pair of sections. The three conductors are thus wound side by side throughout all the sections I to VI in the half winding.

The last turn 18 of one of the conductors in the second section VI of the last pair of sections in the first half winding is directly connected by return connector $R_1$ to the first turn 19 of the second conductor in the first section I of the first pair of sections in this half winding. The last turn 36 of the second conductor in section VI is directly connected by return connector $R_2$ to the first turn 37 of the third conductor in the first section I.

A capacitive by-path between terminals $T_1$ and $T_0$ lies through the capacitive couplings between the first few turns 1, 2, 3 of one conductor and the first few turns 19, 20, 21 of the second conductor, then through the return connector $R_1$ to turn 18 in section VI and the capacitive couplings between the last few turns 17 and 18 of the first conductor and some of the last few turns 52, 53 of the third conductor in section VI. Another capacitive by-path in parallel with that just described lies through the capacitive coupling between some of the first few turns 2 and 3 of the first conductor and some of the first few turns 37, 38 of the third conductor in section I, through return connector $R_2$ to turn 36 in section VI, and through the capacitive couplings between the last few turns 34, 35, 36 of the second conductor and the last few turns 52, 53, 54 of the third conductor in section VI.

In the winding illustrated by FIGURE 3, the return connector $R_1$ is taken from one end of the complete winding to the other, and the mid-tap terminal $T_0$ is connected to this return connector $R_1$. The capacitive by-path from terminal $T_1$ to terminal $T_0$ is provided by the capacitive couplings between the first few turns 1, 2, 3 of one conductor and the first few turns 19, 20, 21 of the other conductor in section I, this by-path being completed by one-half of the return connector $R_1$.

Figure 4:
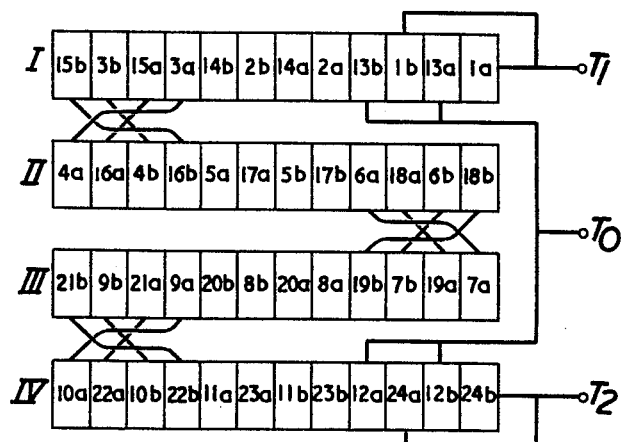

In the winding illustrated by FIGURE 4, there are four sections each made up of three turns of four conductors which are wound side by side throughout the winding. Every turn 1a, 2a, 3a of the first conductor lies juxtaposed to, but insulated from, a turn 13a, 14a, 15a of the second conductor, and turns 2a and 3a are also juxtaposed to, but insulated from, turns 13b and 14b of the fourth conductor. Likewise every turn of the first and third conductors lies juxtaposed to, but insulated from, a turn of the second conductor and/or a turn of the fourth conductor, and every turn of the second and fourth conductors lies juxtaposed to, but insulated from, a turn of the first conductor and/or a turn of the third conductor.

The first turns 1a and 1b of the first and third conductors are both connected to the end terminal $T_1$. The last turns 12a and 12b of the first and third conductors in section IV are connected together and by a return connector to the first turns 13a and 13b of the second and fourth conductors in section I. The mid-tap terminal $T_0$ is also joined to this return connector. Capacitive by-paths between terminals $T_1$ and $T_0$ are provided by the capacitive couplings between the first few turns 1a, 1b, 2a, 2b of the first and third conductors and the first few turns 13a, 13b, 14a, 14b of the second and fourth conductors.

Figure 5:
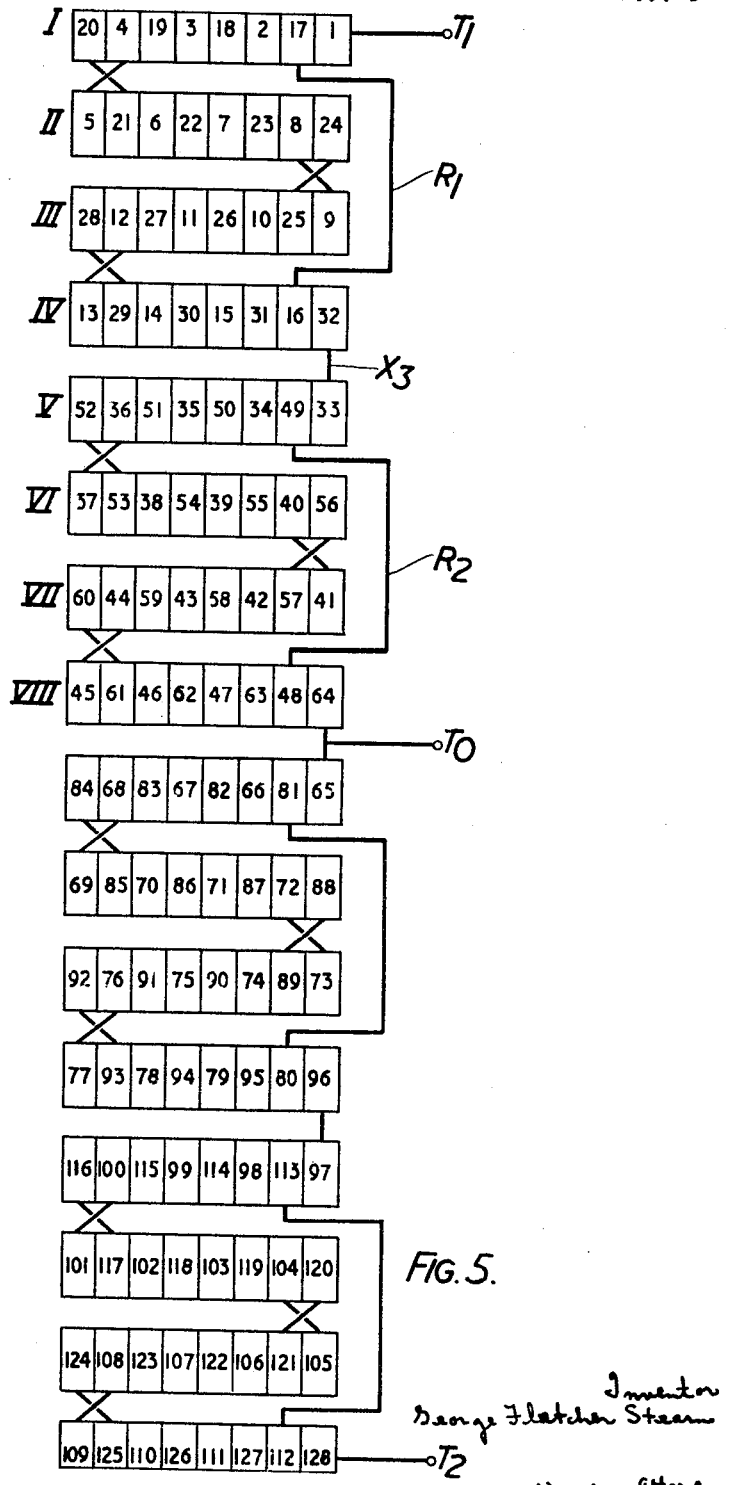

In the winding illustrated by FIGURE 5, the sixteen section. There is a capacitive by-path from terminal $T_1$ sisting of four sections with a return connection from the last turn of the first conductor in the fourth section to the first turn of the second conductor in the first section. There is a capactive by-path from terminal $T_1$ to terminal $T_0$ through the capacitive couplings between the two conductors in section I, through return connector $R_1$, through the capacitive couplings between the conductors in section IV, through connector $X_3$, through the capacitive couplings between the conductors in section V, through return connector $R_2$, and through the capacitive couplings between the conductors in section VIII.

Figure 6:
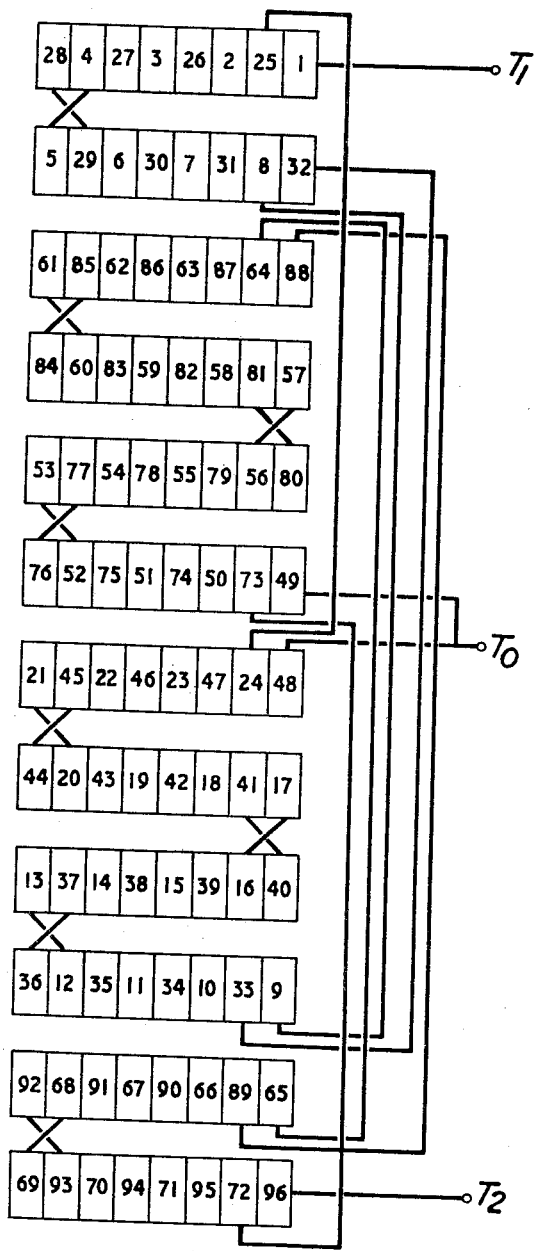
Figure 7A:
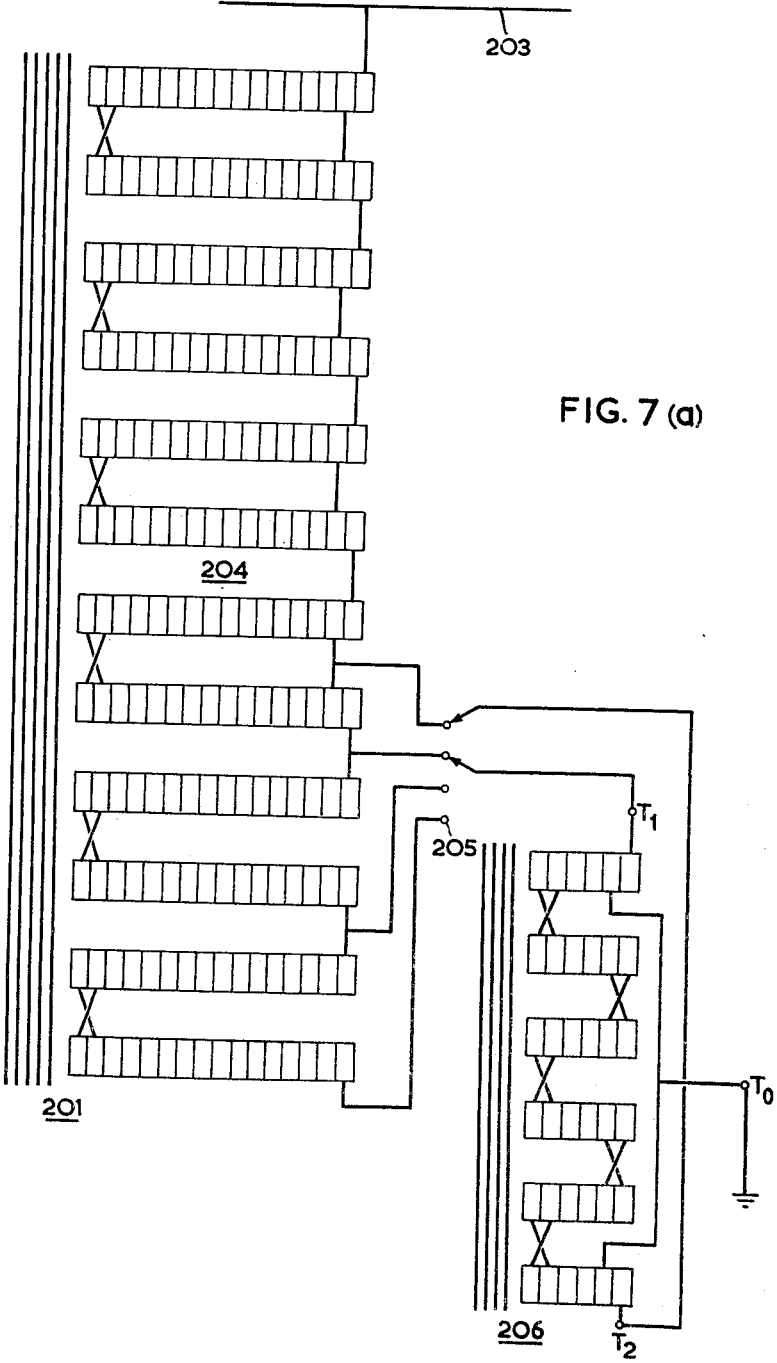

The winding illustrated by FIGURE 6 is similar in principle to that illustrated by FIGURE 1, but the second and third pairs of sections are transposed physically with the fifth and fourth pairs of sections. The connectors between turns 8 and 32 and turns 9 and 33 respectively are carried along the outside of the winding like the return connectors shown in the other figures.

FIGURES 7 to 11 of the drawings show diagrammatically a number of typical circuit arrangements in which a main power transformer is associated with a smaller auxiliary transformer.

FIGURE 7 of the drawings shows a circuit arrangement in which a main single-phase power transformer 201 provides a connection between low-voltage apparatus connected to the terminals of its low-voltage winding 202 and a transmission line 203 connected to one terminal of its high-voltage winding 204. The remaining end of the high-voltage winding 204 is connected to ground at any one of a series of tappings 205 through the agency of a mid-tapped auto-transformer 206.

The centre tap $T_0$ of the auto-transformer is connected to ground and the outer terminals $T_1$ and $T_2$ are associated with tap-changing gear by means of which they can be switched between successive tappings 205 of the high-voltage winding 204. Variation of the ratio of the main transformer 201 can thus be effected by successively switching the auto-transformer terminals $T_1$ and $T_2$ from one tapping 205 to the next. In steady conditions both the auto-transformer terminals are connected to the same tapping, the two halves of the auto-transformer winding being thus in parallel; in these conditions the voltage drop in the auto-transformer should be as low as possible, and to achieve this magnetic interlacing of the various sections of the auto-transformer winding, for example by the winding arrangement shown in FIG. 6 of the drawings, is sometimes adopted.

FIG. 7(a) shows in greater detail, and in accordance with the convention of FIGS. 1 to 6, the items 201 and 203 to 206 of an example of a transformer combination according to FIG. 7. In this example winding 204 of the main transformer 201 is shown as wound in accordance with FIG. 2 of my prior Patent No. 2,453,552, while the winding of auxiliary transformer 206 is shown as wound in accordance with FIG. 3 of the present specification.

In the arrangement shown in FIG. 8, the main power transformer takes the form of an auto-transformer 211, its winding being provided with a series of intermediate tappings 212 which can be selectively connected to its associated transmission line 213 by means of the centre-tapped auxiliary auto-transformer 214, which is thus situated at the "line" end of the high-voltage winding instead of the "ground" or "neutral" end. For the purpose of ratio selection this arrangement functions in the same way as that shown in FIGURE 7, but rather different considerations, as will be explained below, determine its behaviour under applied voltage surges.

FIGURE 9 of the drawings illustrates another type of circuit arrangement. A main power transformer 212, feeding a transmission line 222 from a source connected to its low-voltage winding 223, has an auxiliary or booster transformer 224 connected in series with the "earthy" end of the high-voltage winding 225. The transformer 224 consists of a low-voltage winding 226 connected in parallel with the low-voltage winding 223 of the main transformer, and a tapped secondary winding 227. Variation of the tapping on this winding to which the ground connection of the combination is connected permits the variation of the boosting voltage injected into the high-voltage circuit by the transformer 224. In normal working conditions the voltage across the secondary winding 227 of the booster transformer will amount at most to some 15% of the voltage fed to the transmission line 222.

In the alternative arrangement shown in FIG. 10, the secondary winding 231 of the booster transformer 232 has no intermediate taps and is connected in series with the line end of the high-voltage winding 233 of the main power transformer 234. The primary winding 235 of the booster transformer is fed from a tertiary winding 236 of the main transformer.

It will be understood that many variations are possible in the arrangements of FIGS. 7 to 10. All such arrangements essentially consist, however, of a main transformer winding having a winding of a smaller auxiliary transformer connected in series with it, the auxiliary transformer being the tap-changing transformer in FIGS. 7 and 8 and the booster transformer in FIGS. 9 and 10. Another possible arrangement is shown in FIG. 11 of the drawings, in which a combination similar to that shown in FIG. 10 is employed as a booster transformer unit or two-core booster 241 working in conjunction with a further main power transformer 242. From the point of view of its behaviour under surge conditions, the booster transformer unit 241 consists of a main or potential winding 243, which has to withstand the full line voltage of the system, and a relatively small series winding 244 connected in series with it.

The winding arrangements described and claimed in the specification of my prior Patent 2,453,552, and particularly those claimed in one of claims 1, 2 and 5 thereof, can be applied throughout the main high-voltage windings of the arrangements shown in FIGS. 7 to 11 to provide a high-voltage winding of relatively high series capacitance, thereby to a large extent safeguarding the winding from the effects of voltage surges. It is found that the adoption in the auxiliary transformer (the auto-transformer or booster transformer) of any of the winding arrangements shown in FIGS. 1–6 (that shown in FIG. 3 being preferred) enables the auxiliary transformer and thus the combination as a whole to be similarly safeguarded.

It will be understood that while the winding arrangements shown in FIGS. 1 to 6 are for a centre-tapped auto-transformer, only minor modifications in the tapping arrangements are necessary to render the windings suitable for other applications such as the booster transformer shown in FIGS. 9 to 11.

For a voltage surge having sufficiently high rate of rise of its leading edge, an inductive winding can be represented by two capacitances connected in series and a third capacitance connected between their mid-point and ground. Thus in FIG. 12, which represents the equivalent network presented by two serially-connected transformer windings A and B, connected between a transmission line L and ground, to such a steep-fronted voltage surge, each transformer is represented by the series capacitances $C_{SA}$ or $C_{SB}$ respectively and by the ground capacitance $C_{GA}$ or $C_{GB}$. These assumptions are at best approximate, but will serve to indicate the principles involved.

Each of the notional series capacitances $C_{SA}$ and $C_{SB}$ is equal to twice the total series capacitance of the respective transformer winding. For most windings, and certainly for conventional simple types of winding, the ground capacitance is considerably larger than the total series capacitance.

Applying the equivalent circuit of FIG. 12 first to the arrangements shown in FIGS. 7 and 9, the upper transformer A represents the winding of the main power transformer connected directly to the line, and transformer B the serially-connected winding of the auxiliary auto-transformer or booster transformer. The main transformer winding A is provided, for example by means of the invention of my prior Patent 2,453,552, with series capacitances $C_{SA}$ of relatively high values; the second winding B, which will be physically a much smaller unit than the main transformer, being wound for a fraction only of its voltage and volt-ampere rating, will have relatively low values of series capacitance $C_{SB}$. A voltage surge applied to the transmission line L will therefore result in an appreciable initial surge voltage appearing across the winding B. Since winding B generally operates at potentials not far removed from ground potential, it will be provided with correspondingly low insulation levels; and this initial surge voltage may be sufficient to cause its insulation to break down. Furthermore, in steady conditions at working frequency the voltage across the winding B will be a very much smaller proportion of the total voltage across the combination than is the case in surge conditions; if winding B is an auto-transformer for tap-changing, as in FIG. 7, the voltage across it is normally so small as to be negligible; and if it is a booster transformer, as in FIG. 9, the maximum voltage across it in a typical system will be some 10% of the total. This discrepancy between the voltage distribution between the two windings A and B in surge conditions and in steady conditions, respectively, may result in voltage oscillations of large amplitude following the initial application of the surge, and these may again lead to breakdown of the insulation of winding B.

These difficulties can be avoided by increasing the series capacitances $C_{SB}$ of winding B; but adopting the winding arrangements described in the specification of my prior patent for this purpose proved unsatisfactory, since in the smaller unit they did not provide a sufficient increase in capacitance. The winding arrangements shown in FIGS. 1 to 6 of the present specification were therefore devised with the object of providing a sufficiently high level of series capacitance to avoid insulation breakdowns arising from this cause.

When, as in the arrangements of FIGS. 8, 10 and 11, the winding A to which the voltage surge is directly applied is the smaller auxiliary transformer, winding 13 being a high-voltage winding in which the invention of my prior Patent 2,453,552 (or other suitable means) is employed to provide relatively high values of series capacitance $C_{SB}$, the tendency on the initial application of a voltage surge is for the greater part of the surge voltage to be applied across the auxiliary transformer winding. The risk of breakdown as the result of both of the initial surge and of subsequent voltage oscillations between the windings is again present, in spite of the much higher level of insulation appropriate to a component at the "line" end of the main high-voltage winding.

Increases in the series capacitances of the auxiliary transformer winding sufficient to safeguard the auxiliary transformer are provided in such systems by employing the winding arrangements shown in FIGS. 1 to 6 of this specification.

What I claim as my invention and desire to secure by Letters Patent is:

1. An inductive winding having at least one part which consists of a plurality of pairs of annular sections, one annular section of each pair comprising a plurality of conductors wound side by side and spiralling inwardly and the other annular section of each pair comprising a plurality of conductors wound side by side and spiralling outwardly, the last turn of every conductor in the inwardly spiralling section of every pair being individually directly connected to the first turn of a conductor in the outwardly spiralling section of the same pair, the last turn of every conductor in the outwardly spiralling section of every pair except the last pair being individually directly connected to the first turn of a conductor in the inwardly spiralling section of another pair and the last turn of every conductor except one in the outwardly spiralling section of the last pair being individually directly connected to the first turn of a conductor in the inwardly spiralling section of the first pair so as to connect all of said conductors in series.

2. An inductive winding having at least one part which consists of a plurality of pairs of annular sections, one annular section of each pair comprising two conductors wound side by side and spiralling inwardly and the other annular section of each pair comprising two conductors wound side by side and spiralling outwardly, the last turn of a first conductor in the inwardly spiralling section of every pair being directly connected to the first turn of a first conductor in the outwardly spiralling section of the same pair, the last turn of the second conductor in the inwardly spiralling section of every pair being directly connected to the first turn of the second conductor in the outwardly spiralling section of the same pair, the last turn of said first conductor in the outwardly spiralling section of every pair except the last pair being directly connected to the first turn of said first conductor in the inwardly spiralling section of another pair, the last turn of said second conductor in the outwardly spiralling section of every pair except the last pair being directly connected to the first turn of said second conductor in the inwardly spiralling section of said other pair, and the last turn of said first conductor in the outwardly spiralling section of said last pair being directly connected to the first turn of said second conductor in the inwardly spiralling section of said first pair.

3. An inductive winding having at least one part which consists of three pairs of annular sections, one annular section of each pair comprising two conductors wound side by side and spiralling inwardly and the other annular section of each pair comprising two conductors wound side by side and spiralling outwardly, the last turn of a first conductor in the inwardly spiralling section of every pair being directly connected to the first turn of a first conductor in the outwardly spiralling section of the same pair, the last turn of the second conductor in the inwardly spiralling section of every pair being directly connected to the first turn of the second conductor in the outwardly spiralling section of the same pair; the last turn of said first conductor in the outwardly spiralling section of the first pair being directly connected to the first turn of said first conductor in the inwardly spiralling section of the second pair, the last turn of said second conductor in the outwardly spiralling section of said first pair being directly connected to the first turn of said second conductor in the inwardly spiralling section of said second pair, the last turn of said first conductor in the outwardly spiralling section of said second pair being directly connected to the first turn of said first conductor in the inwardly spiralling section of the third pair, the last turn of said second conductor in the outwardly spiralling section of said second pair being directly connected to the first turn of said second conductor in the inwardly spiralling section of said third pair, and the last turn of said first conductor in the outwardly spiralling section of said third pair being directly connected to the first turn of said second conductor in the inwardly spiralling section of said first pair.

4. An inductive winding having at least one part which consists of two pairs of annular sections, one annular section of each pair comprising two conductors wound side by side and spiralling inwardly and the other annular section of each pair comprising two conductors wound side by side and spiralling outwardly, the last turn of a first conductor in the inwardly spiralling section of each pair being directly connected to the first turn of a first conductor in the outwardly spiralling section of the same pair, the last turn of the second conductor in the inwardly spiralling section of each pair being directly connected to the first turn of the second conductor in the outwardly spiralling section of the same pair, the last turn of said first conductor in the outwardly spiralling section of the first pair being directly connected to the first turn of said first conductor in the inwardly spiralling section of the second pair, the last turn of said second conductor in the outwardly spiralling section of said first pair being directly connected to the first turn of said second conductor in the inwardly spiralling section of said second pair, and the last turn of said first conductor in the outwardly spiralling section of said second pair being directly connected to the first turn of said second conductor in the inwardly spiralling section of said first pair.

5. An inductive winding having at least one part which consists of three pairs of annular sections, one annular section of each pair comprising three conductors wound side by side and spiralling inwardly and the other annular section of each pair comprising three conductors wound side by side and spiralling outwardly, the last turns of first, second and third conductors in the inwardly spiralling section of each pair being individually directly connected to the first turns of first, second and third conductors in the outwardly spiralling section of the same pair, the last turns of said first, second and third conductors in the outwardly spiralling sections of the first and second pairs being individually directly connected to the first turns of first, second and third conductors in the inwardly spiralling sections of the second and third pairs respectively, and the last turns of said first and second conductors in the outwardly spiralling section of said third pair being individually directly connected to the first turns of said second and third conductors in the inwardly spiralling section of said first pair.

6. An inductive winding having at least one part which consists of a plurality of pairs of annular sections, one annular section of each pair comprising a plurality of conductors wound side by side and spiralling inwardly and the other annular section of each pair comprising a plurality of conductors wound side by side and spiralling outwardly, the last turn of every conductor in the inwardly spiralling section of every pair being individually directly connected to the first turn of a conductor in the outwardly spiralling section of the same pair, the last turn of every conductor in the outwardly spiralling section of every pair except the last pair being individually directly connected to the first turn of a conductor in the inwardly spiralling section of another pair, and the last turns of half of the conductors, alternately positioned in the outwardly spiralling section of the last pair, being connected together and also being directly connected to the first turns of half of the conductors, alternately positioned in the inwardly spiralling section of the first pair.

7. Inductive apparatus comprising in combination first and second inductive windings wound on separate cores and electrically connected so that at least part of the first winding is electrically in series with at least part of the second winding, the first winding having means for increasing its series capacitance and the second winding, which consists of fewer turns than the first winding, being a winding as claimed in claim 1.

8. Inductive apparatus according to claim 7, wherein the said means for increasing the series capacitance of the first winding consists in the winding arrangement thereof, the said first winding having at least a high-potential end portion comprising a pair of annular sections each containing a plurality of conductor turns and comprising a plurality of cross-connections between said sections, at least some of the conductor turns in one section forming at least one inward spiral and at least some of the conductor turns in the other section forming at least one outward spiral and wherein a conductive path is provided from the outermost turn of one section to the outermost turn of the other section, said conductive path being wholly within said pair of sections and said cross-connections, and passing through at least one inward spiral, at least one inner cross-connection between an inward and an outward spiral, at least one outward spiral, and at least one outer cross-connection between the second outermost turn of one of said sections and one of the two outermost turns of the other of said sections, and wherein a capacitive by-path is provided through said outer cross-connection and through at least one of the capacitances between the outermost turns and the second outermost turns of said sections.

9. Inductive apparatus according in claim 7, wherein the said means for increasing the series capacitance of the first winding consists in the winding arrangement thereof, the said first winding having at least a portion at its high potential end arranged in a pair of annular sections spaced apart along a common axis and having cross-connections between them, one of the sections containing at least one conductor which consists of a plurality of turns spiralling inwards and the other of the sections containing at least one conductor which consists of a plurality of turns spiralling outwards, characterized in that there is a conductive path from a starting turn near the outside edge of one section to a finishing turn near the outside edge of the other section, this conductive path comprising, in the order named, from the starting turn an inward spiral in one section, an inner cross-connection, an outward spiral in the other section, an outer cross-connection, a second inward spiral in the first-named section, a second inner cross-connection, and a second outward spiral in the second-named section to the finishing turn, and further characterized in that there is a capacitive by-path from said starting turn to said finishing turn comprising in the order named, the capacitive coupling between the starting turn and the first turn of the second inward spiral, said outer cross-connection, and the capacitive coupling between the last turn of the first outward spiral and the finishing turn; the turns of the two inward spirals being superposed and interleaved in a single radial layer, and similarly the turns of the two outward spirals being superposed and interleaved in a single radial layer.

References Cited in the file of this patent

UNITED STATES PATENTS

| | | |
|---|---|---|
| 2,453,552 | Stearn | Nov. 9, 1948 |
| 2,673,328 | Gilbert | Mar. 23, 1954 |